United States Patent
Wang et al.

(10) Patent No.: US 11,758,522 B2
(45) Date of Patent: Sep. 12, 2023

(54) METHODS AND APPARATUSES FOR DETERMINING A TRANSPORT BLOCK SIZE (TBS) FOR DATA TRANSMISSION

(71) Applicant: Huawei Technologies Co., Ltd., Shenzhen (CN)

(72) Inventors: Hong Wang, Beijing (CN); Yue Zhao, Beijing (CN); Zheng Yu, Beijing (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 17/035,200

(22) Filed: Sep. 28, 2020

(65) Prior Publication Data

US 2021/0014860 A1 Jan. 14, 2021

Related U.S. Application Data

(63) Continuation of application No. PCT/CN2018/081965, filed on Apr. 4, 2018.

(51) Int. Cl.
*H04W 72/0446* (2023.01)
*H04W 72/02* (2009.01)

(52) U.S. Cl.
CPC ....... *H04W 72/0446* (2013.01); *H04W 72/02* (2013.01)

(58) Field of Classification Search
CPC ............... H04W 72/0446; H04W 72/02
See application file for complete search history.

(56) References Cited

U.S. PATENT DOCUMENTS

2010/0279634 A1 11/2010 Sagfors et al.
2016/0112898 A1 4/2016 Chen et al.
(Continued)

FOREIGN PATENT DOCUMENTS

CN 101400066 A 4/2009
CN 101640579 A 2/2010
(Continued)

OTHER PUBLICATIONS

Mediatek Inc., "On NB-IoT EDT indication via PRACH", 3GPP TSG RAN WG2 Meeting #100, R2-1713679, Reno, Nevada, USA, Nov. 27-Dec. 1, 2017, 5 pages.
(Continued)

*Primary Examiner* — Michael Thier
*Assistant Examiner* — Nevena Zecevic Sandhu
(74) *Attorney, Agent, or Firm* — Slater Matsil, LLP

(57) ABSTRACT

According to embodiments, a method includes: receiving first indication information, where the first indication information indicates a TBS threshold; receiving second indication information from a network device, where the second indication information indicates a quantity N of candidate TBSs; obtaining a first TBS set, where a quantity of elements in the first TBS set is equal to the quantity N of the candidate TBSs, and a largest TBS in the first TBS set is less than or equal to the TBS threshold indicated by the first indication information; selecting, from the first TBS set, a target TBS to be used for transmission of first data, where the target TBS is a smallest TBS, in the first TBS set, greater than or equal to a TBS required by the first data; and sending the first data to the network device based on the target TBS.

18 Claims, 6 Drawing Sheets

(56) References Cited

U.S. PATENT DOCUMENTS

| | | | | |
|---|---|---|---|---|
| 2020/0059390 A1* | 2/2020 | Zhang | ............... | H04W 72/14 |
| 2020/0367294 A1* | 11/2020 | Wong | ............... | H04W 72/042 |
| 2021/0058823 A1* | 2/2021 | Liu | ............... | H04W 74/0833 |
| 2021/0136826 A1* | 5/2021 | Chang | ............... | H04W 72/02 |

FOREIGN PATENT DOCUMENTS

| | | |
|---|---|---|
| CN | 102111866 A | 6/2011 |
| CN | 106465378 A | 2/2017 |
| EP | 3297319 A1 | 3/2018 |
| WO | 2018203727 A1 | 11/2018 |

OTHER PUBLICATIONS

Ericsson, "Early data transmission for MTC", 3GPP TSG-RAN WG1 Meeting #91 R1-1719350, Reno, Nevada, USA, Nov. 27-Dec. 1, 2017, 5 pages.

3rd Generation Partnership Project; Technical Specification Group Radio Access Network; Evolved Universal Terrestrial Radio Access (E-UTRA); Physical layer procedures (Release 15), 3GPP TS 36.213 V15.1.0 (Mar. 2018), 495 pages.

Ericsson, "TB sizes and UL grant for Msg3", 3GPP TSG-RAN WG2 #101 R2-1803080, Athens, Greece, Feb. 26-Mar. 2, 2018, 7 pages.

3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.1.0 (Mar. 2018), 109 pages.

3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331 V15.1.0 (Mar. 2018), 786 pages.

Ericsson, "Report on [100#38][MTC/NB-IoT] Padding issue in Msg3", 3GPP TSG-RAN WG2 #101, R2-1803077, Athens, Greece, Feb. 26-Mar. 2, 2018, 24 pages.

Samsung, "Early data transmission for eMTC", 3GPP TSG RAN WG1 Meeting #92, R1-1801924, Athens, Greece, Feb. 26-Mar. 2, 2018, 6 pages.

\* cited by examiner

METHODS AND APPARATUSES FOR DETERMINING A TRANSPORT BLOCK SIZE (TBS) FOR DATA TRANSMISSION

CROSS-REFERENCE TO RELATED APPLICATIONS

This application is a continuation of International Application No. PCT/CN2018/081965, filed on Apr. 4, 2018, the disclosure of which is hereby incorporated by reference in its entirety.

TECHNICAL FIELD

This application relates to the field of communications technologies, and in particular, to a data transmission method, a communications device, and a network device.

BACKGROUND

For long term evolution machine type communication (LTE MTC) or a narrowband internet of things (NB-IoT) (where the following uses the MTC as an example for description), data transmission of the LTE MTC or the NB-IoT is characterized by a relatively small data volume, and the data transmission is periodic.

To implement transmission of data with a relatively small data volume, an early data transmission (EDT) method is usually used. In the prior aft, when early data transmission is performed, a base station broadcasts a system message, where the system message includes a TBS threshold; and when a terminal device receives the system message and determines that a data volume of to-be-sent uplink data is less than or equal to the TBS threshold, the terminal device sends, to the base station, a message indicating the EDT, so that the base station allocates, to the terminal device, a resource to be used to transmit the uplink data. However, resource utilization efficiency of the method may be relatively low.

SUMMARY

This application provides a data transmission method, a communications device, and a network device, to improve resource utilization efficiency in an early data transmission process.

According to a first aspect, an embodiment of this application provides a data transmission method. The method may include: receiving first indication information, where the first indication information is used to indicate a transport block size TBS threshold; receiving second indication information from a network device, where the second indication information is used to indicate a quantity N of candidate TBSs; obtaining a first TBS set, where a quantity of elements in the first TBS set is equal to the quantity N of the candidate TBSs, and a largest TBS in the first TBS set is less than or equal to the TBS threshold indicated by the first indication information; selecting, from the first TBS set, a target TBS to be used for transmission of first data, where the target TBS is a smallest TBS, in the first TBS set, greater than or equal to a TBS required by the first data; and sending the first data to the network device based on the target TBS.

It can be learned that, when the first data is sent, the first TBS set is first obtained by using the second indication information, and the smallest TBS that is greater than or equal to the TBS required by the first data is selected from the first TBS set as the target TBS, which is different from the prior art in which data is directly transmitted based on the TBS threshold broadcast by the network device. Because the target TBS is greater than or equal to the TBS required by the first data, transmission of the first data is not affected when the first data is transmitted based on the target TBS. In addition, because the target TBS is the smallest TBS greater than or equal to the TBS required by the first data, a relatively small quantity of bits "0" need to be additionally padded, so that a relatively small quantity of resources are wasted and resource utilization is improved.

In a possible implementation, the first TBS set is a subset of a second TBS set, the first TBS set includes N TBSs, in the second TBS set, that are less than or equal to the TBS threshold indicated by the first indication information and that have smallest differences from the TBS threshold indicated by the first indication information, and N is the quantity of the candidate TBSs.

In a possible implementation, the first TBS set is a subset of a second TBS set, the first TBS set includes N TBSs in the second TBS set, the N TBSs include a smallest TBS and a largest TBS in the second TBS set, N is equal to the quantity of the candidate TBSs, and the N TBSs are evenly distributed in the second TBS set.

In a possible implementation, the method may further include: receiving third indication information from the network device, where the third indication information is used to indicate a coverage enhancement level, and the coverage enhancement level is associated with the quantity of the candidate TBSs.

In a possible implementation, the second TBS set is specified in a communications protocol; or the second TBS set is indicated by configuration information, where the configuration information is received from the network device.

In a possible implementation, the second TBS set is a TBS set in a coverage enhancement mode, and the coverage enhancement mode is a CE mode A or a CE mode B; and if the coverage enhancement mode is the CE mode A, the second TBS set includes 328, 376, 392, 408, 424, 440, 456, 472, 488, 504, 536, 552, 584, 600, 616, 680, 712, 744, 776, 808, 840, 872, 904, 936, and 1000; or if the coverage enhancement mode is the CE mode A, the second TBS set includes 328, 424, 536, 616, 712, 808, 904, and 1000; or if the coverage enhancement mode is the CE mode B, the second TBS set includes 328, 392, 408, 424, 456, 472, 504, 536, 584, 600, 616, 680, 712, 776, 808, 872, and 936; or if the coverage enhancement mode is the CE mode B, the second TBS set includes 328, 408, 504, 584, 680, 776, 872, and 936.

In a possible implementation, the receiving second indication information from a network device may include: receiving a system message from the network device, where the system message includes the second indication information.

In a possible implementation, the receiving second indication information from a network device may include: receiving a message 2 from the network device, where the message 2 includes the second indication information.

In a possible implementation, a MAC subheader included in the message 2 includes the second indication information; or a random access response RAR included in the message 2 includes the second indication information; or an uplink grant UL grant included in the message 2 includes the second indication information.

In a possible implementation, the first data is a message 3 including user plane data.

In a possible implementation, the method is used in a random access process.

According to a second aspect, an embodiment of this application provides a data transmission method. The method may include: sending first indication information, where the first indication information is used to indicate a transport block size TBS threshold; sending second indication information to a terminal device, where the second indication information is used to indicate a quantity N of candidate TBSs, the quantity of the candidate TBSs is a quantity of elements in a first TBS set, and a largest TBS in the first TBS set is less than or equal to the TBS threshold indicated by the first indication information; and receiving first data from the terminal device, where the first data is sent by the terminal device based on a target TBS, and the target TBS is a smallest TBS, in the first TBS set, greater than or equal to a TBS required by the first data.

In a possible implementation, the first TBS set is a subset of a second TBS set, the first TBS set includes N TBSs, in the second TBS set, that are less than or equal to the TBS threshold indicated by the first indication information and that have smallest differences from the TBS threshold indicated by the first indication information, and N is the quantity of the candidate TBSs.

In a possible implementation, the first TBS set is a subset of a second TBS set, the first TBS set includes N TBSs in the second TBS set, the N TBSs include a smallest TBS and a largest TBS in the second TBS set, N is the quantity of the candidate TBSs, and the N TBSs are evenly distributed in the second TBS set.

In a possible implementation, the method may further include: sending third indication information to the terminal device, where the third indication information is used to indicate a coverage enhancement level, and the coverage enhancement level is associated with the quantity of the candidate TBSs.

In a possible implementation, the second TBS set is specified in a communications protocol; or the second TBS set is indicated by configuration information, where the configuration information is sent to the terminal device.

In a possible implementation, the second TBS set is a TBS set in a coverage enhancement mode, and the coverage enhancement mode is a CE mode A or a CE mode B; and if the coverage enhancement mode is the CE mode A, the second TBS set includes 328, 376, 392, 408, 424, 440, 456, 472, 488, 504, 536, 552, 584, 600, 616, 680, 712, 744, 776, 808, 840, 872, 904, 936, and 1000; or if the coverage enhancement mode is the CE mode A, the second TBS set includes 328, 424, 536, 616, 712, 808, 904, and 1000; or if the coverage enhancement mode is the CE mode B, the second TBS set includes 328, 392, 408, 424, 456, 472, 504, 536, 584, 600, 616, 680, 712, 776, 808, 872, and 936; or if the coverage enhancement mode is the CE mode B, the second TBS set includes 328, 408, 504, 584, 680, 776, 872, and 936.

In a possible implementation, the sending second indication information to a terminal device may include: sending a system message to the terminal device, where the system message includes the second indication information.

In a possible implementation, the sending second indication information to a terminal device may include: sending a message 2 to the terminal device, where the message 2 includes the second indication information.

In a possible implementation, a MAC subheader included in the message 2 includes the second indication information; or a random access response RAR included in the message 2 includes the second indication information; or an uplink grant UL grant included in the message 2 includes the second indication information.

In a possible implementation, the first data is a message 3 including user plane data.

In a possible implementation, the method is used in a random access process.

According to a third aspect, an embodiment of this application provides a communications device. The communications device includes a processor, and the processor is configured to: be coupled to a memory, and read and execute an instruction in the memory, to implement the method according to any one of the first aspect and the possible implementations of the first aspect.

In a possible implementation, the communications device may further include: the memory.

According to a fourth aspect, an embodiment of this application provides a network device. The network device includes a processor, and the processor is configured to: be coupled to a memory, and read and execute an instruction in the memory, to implement the method according to any one of the second aspect and the possible implementations of the second aspect.

In a possible implementation, the network device may further include: the memory.

According to a fifth aspect, an embodiment of this application provides a computer storage medium. The computer storage medium includes an instruction; and when the instruction is run on a communications device, the communications device is enabled to perform the method according to any one of the first aspect and the possible implementations of the first aspect.

According to a sixth aspect, an embodiment of this application provides a computer storage medium. The computer storage medium includes an instruction; and when the instruction is run on a network device, the network device is enabled to perform the method according to any one of the second aspect and the possible implementations of the second aspect.

According to the data transmission method, the communications device, and the network device that are provided in embodiments of this application, by receiving the first indication information and the second indication information that are sent by the network device, the terminal device may obtain the first TBS set based on the second indication information, select, from the first TBS set, the target TBS to be used for transmission of the first data, and then send the first data to the network device based on the target TBS, where the second indication information is used to indicate the quantity of the candidate TBSs. It can be learned that, when the first data is sent, the first TBS set is first obtained by using the second indication information, and the smallest TBS that is greater than or equal to the TBS required by the first data is selected from the first TBS set as the target TBS, which is different from the prior art in which data is directly transmitted based on the TBS threshold broadcast by the network device. Because the target TBS is greater than or equal to the TBS required by the first data, transmission of the first data is not affected when the first data is transmitted based on the target TBS. In addition, because the target TBS is the smallest TBS greater than or equal to the TBS required by the first data, a relatively small quantity of bits "0" need to be additionally padded, so that a relatively small quantity of resources are wasted and resource utilization is improved.

DETAILED DESCRIPTION OF ILLUSTRATIVE EMBODIMENTS

Embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, a 5G communications system, or another system that may appear in the future. The following describes some terms in this application to help a person skilled in the art have a better understanding. It should be noted that, when solutions in the embodiments of this application are applied to the 5G system or the another system that may appear in the future, names of a network device and a terminal may change, but this does not affect implementation of the solutions in the embodiments of this application.

Figure 1:
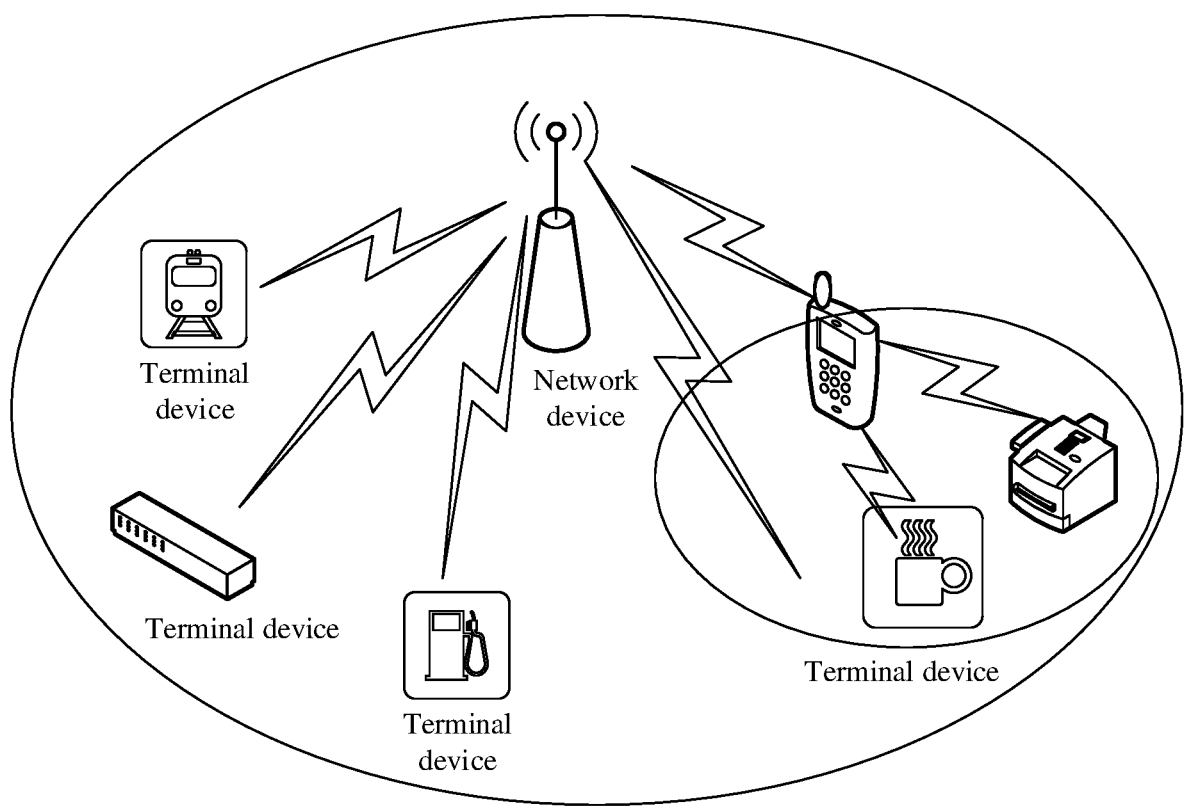
FIG. 1 is a schematic diagram of an application scenario according to an embodiment of this application.

FIG. 1 is a schematic diagram of an application scenario according to an embodiment of this application. The communications system may be applied to MTC or an NB-IoT, and the communications system may include a network device and at least one terminal device. As shown in FIG. 1, for example, the communications system is applied to the MTC, and includes a network device, a first terminal device, and a second terminal device. When the first terminal device and the second terminal device upload data to the network device in an early data transmission (EDT) manner, the network device may first broadcast a system message to the first terminal device and the second terminal device. The system message includes a maximum threshold of a TBS that can be used by the terminal device in EDT. After the first terminal device and the second terminal device receive the system message, if the first terminal device and the second terminal device determine that data volumes of uplink data to be separately sent by the first terminal device and the second terminal device are less than or equal to the TBS threshold, the first terminal device and the second terminal device need to additionally pad "0" when the data volumes are less than the TBS threshold, so that TBSs occupied by the data separately sent by the first terminal device and the second terminal device are the largest TBS threshold. However, in this way, some resources are not used to transmit valid user data, and resource utilization efficiency is relatively low.

(1) A terminal device, also referred to as a terminal or user equipment, is a device that provides a user with voice and/or data connectivity, for example, a handheld device or a vehicle-mounted device having a wireless connection function. Common terminal devices include, for example, a mobile phone, a tablet computer, a notebook computer, a palmtop computer, a mobile internet device (MID), and a wearable device. The wearable device includes, for example, a smart watch, a smart band, or a pedometer.

(2) A network device, also referred to as a radio access network (RAN) device, is a device that enables a terminal device to access a wireless network, and includes network devices in various communications standards, for example, including but not limited to: a base station, an evolved NodeB (eNB), a radio network controller (RNC), a NodeB (NB), a network device controller (BSC), a network device transceiver station (BTS), a home network device (for example, a home evolved NodeB or a home NodeB, HNB), a baseband unit (BBU), and the like.

The network device includes network devices of various frequency standards, for example, including but not limited to a low-frequency network device and a high-frequency network device.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

To resolve a prior-art problem of relatively low resource utilization efficiency in an early data transmission process, the embodiments of this application provides a data transmission method. The method may be applied to a random access process, so that a terminal device first receives first indication information before transmitting first data, where the first indication information is used to indicate a transport block size TBS threshold, obtains a first TBS set, and selects, from the first TBS set, a target TBS to be used for transmission of the first data, where the target TBS is a smallest TBS greater than or equal to a TBS required by the first data, and then sends the first data to a network device based on the target TBS. It can be learned that, according to the data transmission method provided in the embodiments of this application, when the first data is sent, the smallest TBS that is greater than or equal to the TBS required by the first data is selected from the first TBS set as the target TBS, which is different from the prior art in which data is directly transmitted based on the TBS threshold broadcast by the network device. Because the target TBS is greater than or equal to the TBS required by the first data, transmission of the first data is not affected when the first data is transmitted based on the target TBS. In addition, because the target TBS is the smallest TBS greater than or equal to the TBS required by the first data, a relatively small quantity of bits "0" need to be additionally padded, so that a relatively small quantity of resources are wasted and resource utilization is improved.

It should be noted that in the data transmission method shown in the embodiments of this application, the terminal device may obtain the first TBS set in at least three possible manners. Details are as follows:

In a first possible implementation, the network device may send second indication information to the terminal device, so that the terminal device receives the second indication information from the network device, and determines the TBS set based on a quantity of candidate TBSs. The second indication information is used to indicate the quantity of the candidate TBSs. When the second indication information is used to indicate the quantity of the candidate TBSs, optionally, the network device may further send third indication information to the terminal device. The third indication information is used to indicate a coverage enhancement level, and the coverage enhancement level is associated with the quantity of the candidate TBSs. In other words, different coverage enhancement levels may correspond to different quantities of candidate TBSs.

In a second possible implementation, the network device may send fourth indication information to the terminal device, so that the terminal device receives the fourth indication information from the network device. The fourth indication information is used to indicate the first TBS set, and the first TBS set includes an integer quantity of TBS values. Therefore, the terminal device may directly determine the first TBS set based on the fourth indication information.

It should be noted that, in the embodiments of this application, only the foregoing two possible implementations are used as examples for describing manners in which the terminal device obtains the first TBS set, but this does not mean that this application is limited thereto. The following describes in detail the data transmission method provided in the embodiments of this application with reference to the foregoing two possible implementations in which the terminal device obtains the first TBS set.

Figure 2:
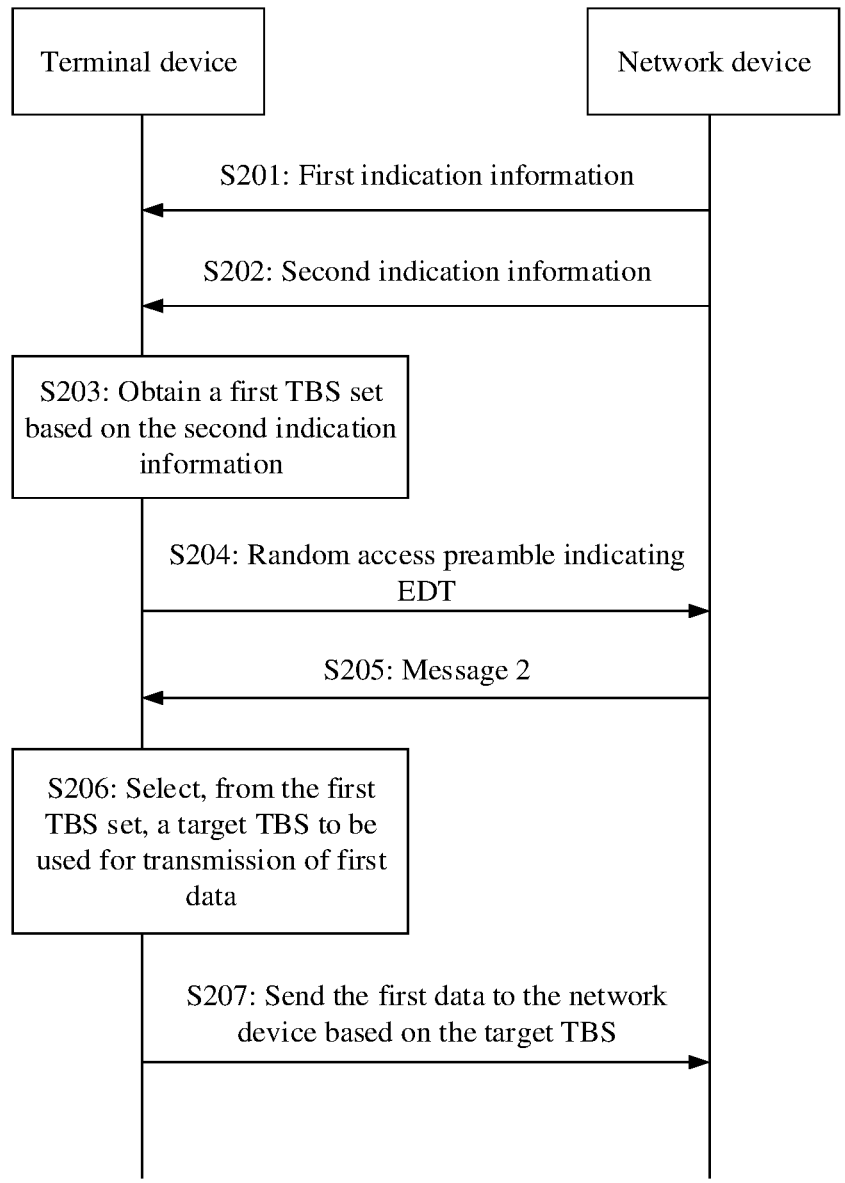
FIG. 2 is a schematic diagram of a data transmission method according to an embodiment of this application.

When the terminal device uses the first possible implementation, in other words, the terminal device obtains the first TBS set based on the second indication information, for a corresponding data transmission method, refer to FIG. 2. FIG. 2 is a schematic diagram of a data transmission method according to an embodiment of this application. The data transmission method may include the following steps.

S201: A network device sends first indication information to a terminal device.

The first indication information is used to indicate a transport block size TBS threshold.

For example, when receiving the first indication information, the terminal device may receive the first indication information by using a system message. A receiving process is specifically: The network device may broadcast the system message, where the system message includes the first indication information, so that the terminal device may receive the first indication information by using the system message.

S202: The network device sends second indication information to the terminal device.

The second indication information is used to indicate a quantity of candidate TBSs.

In this embodiment of this application, an objective of sending the second indication information to the terminal device is: The terminal device may determine a first TBS set based on the quantity, of the candidate TBSs, indicated by the second indication information, and select, from the TBS set, a target TBS to be used for transmission of first data.

Optionally, when the second indication information is used to indicate the quantity of the candidate TBSs, optionally, the network device may further send third indication information to the terminal device. The third indication information is used to indicate a coverage enhancement level, and the coverage enhancement level is associated with the quantity of the candidate TBSs. In other words, when the quantity of the candidate TBSs is determined, the coverage enhancement level needs to be first determined, so that the quantity of the candidate TBSs is determined based on a relationship between the coverage enhancement level and the quantity of the candidate TBSs.

It should be noted that, regarding sending the second indication information to the terminal device, the network device may send the second indication information to the terminal device in at least two possible manners. The manners are specifically as follows.

Manner 1: The network device may send a system message to the terminal device, where the system message includes the second indication information, in other words, the second indication information may be included in the system message and sent to the terminal device. That the system message carries the second indication information may be implemented in the following manner:

```
Systeminformation ::= SEQUENCE {
numTBS      INTEGER (1, ..., 4)
}
``` numTBS indicates the quantity of the candidate TBSs. For example, the quantity of the candidate TBSs may be 1, 2, 3, or 4.

Optionally, when the quantity of the candidate TBSs is different under different coverage enhancement levels, the network device may further send third indication information to the terminal device. The third indication information is used to indicate a coverage enhancement level, and the coverage enhancement level is associated with the quantity of the candidate TBSs, that is, a same quantity or different quantities, of candidate TBSs, corresponding to different coverage enhancement levels. It should be noted that the third indication information may also be sent to the terminal device by using the system message. That the system message carries the second indication information and the third indication information may be implemented in the following manner:

```
Systeminformation ::= SEQUENCE {
numTBSList   SEQUENCE (SIZE(1, ..., maxCE-level)) OF numTBS
}
numTBS ::=    INTERGER (1, ..., 4)
``` numTBSList indicates a list of quantities of candidate TBSs under different coverage enhancement levels, and maxCE-level is a maximum coverage enhancement level. For example, if maxCE-level is 4, there are four coverage enhancement levels: 1, 2, 3, and 4, and each coverage enhancement level corresponds to one numTBS, that is, a quantity of candidate TBSs. For example, a quantity of candidate TBSs under the coverage enhancement level 1 is 2, a quantity of candidate TBSs under the coverage enhancement level 2 is 4, a quantity of candidate TBSs under the coverage enhancement level 3 is 2, and a quantity of candidate TBSs under the coverage enhancement level 4 is 4.

It should be noted that when the network device sends the second indication information to the terminal device by using the system message, both the second indication information and the first indication information may be carried in the system message and sent to the terminal device. Alternatively, when the quantity of the candidate TBSs is a quantity of TBSs corresponding to the coverage enhancement level, all of the first indication information, the second indication information, and the third indication information may be carried in the system message and sent to the terminal device.

Manner 2: The network device may send a message 2 to the terminal device, where the message 2 includes the second indication information, in other words, the second indication information may be carried in the message 2 and sent to the terminal device. The message 2 is a second message including an RAR in a random access process.

It should be noted that when the network device sends the message 2 to the terminal device, optionally, a MAC subheader included in the message 2 may include the second indication information, and therefore the second indication information is sent to the terminal device by using the MAC subheader; or the random access response RAR included in the message 2 may include the second indication information, and therefore the second indication information is sent to the terminal device by using the RAR; or an uplink grant UL grant included in the message 2 may include the second indication information, and therefore the second indication information is sent to the terminal device by using the UL grant.

Figure 3:
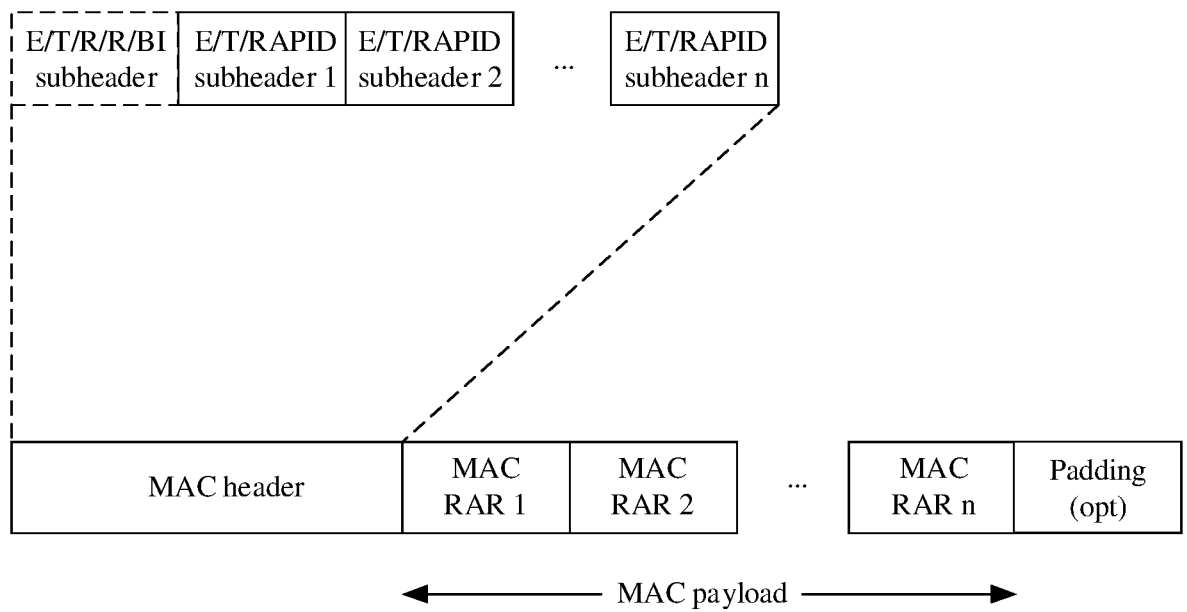
FIG. 3 is a schematic structural diagram of a message 2 according to an embodiment of this application.
Figure 4:
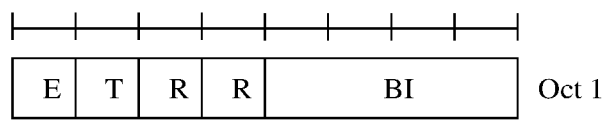
FIG. 4 is a schematic structural diagram of an E/T/R/R/BI MAC subheader according to an embodiment of this application.

For example, FIG. 3 is a schematic structural diagram of a message 2 according to an embodiment of this application. The message 2 may include a MAC header (MAC header), one or more MAC RARs, and padding (optional). The MAC header may include one or more MAC subheaders, and the second indication information may be carried in the first subheader, to be specific, carried in an E/T/R/R/BI MAC subheader. Specifically, the second indication information may be carried by using two reserved bits R in the E/T/R/R/BI MAC subheader. FIG. 4 is a schematic structural diagram of an E/T/R/R/BI MAC subheader according to an embodiment of this application. When two reserved bits R are used to carry the second indication information, a preamble is used to indicate, to the network device, that the terminal device in EDT needs to read the two reserved bits R. For example, when the two reserved bits R are 00, it indicates that the quantity, of the candidate TBSs, indicated by the second indication information is 1; when the two reserved bits R are 01, it indicates that the quantity, of the candidate TBSs, indicated by the second indication information is 2; when the two reserved bits R are 10, it indicates that the quantity, of the candidate TBSs, indicated by the second indication information is 3; when the two reserved bits R are 11, it indicates that the quantity, of the candidate TBSs, indicated by the second indication information is 4. Therefore, the second indication information is carried by using the MAC subheader included in the message 2 and sent to the terminal device. The foregoing use of the reserved bits R is merely an example, and methods of using two reserved bits to indicate 1, 2, 3, or 4 are all included in the present invention. Alternatively, one reserved bit R of the two reserved bits is used to indicate two numbers. For example, the reserved bit R is 0, it indicates 2, and when the reserved bit R is 1, it indicates 4. Methods of using one reserved bit R to indicate any two numbers of 1, 2, 3, and 4 are all included in the present invention.

Figure 5:
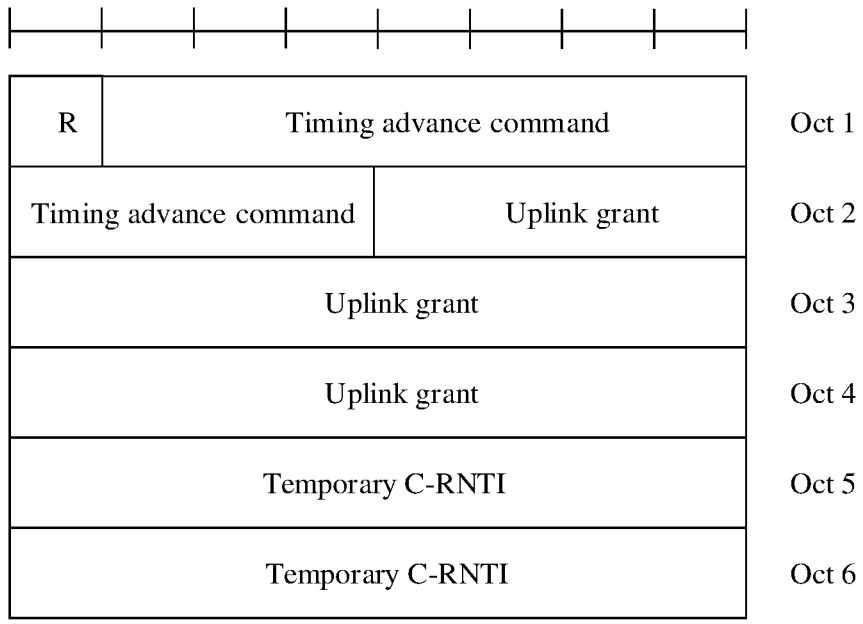
FIG. 5 is a schematic structural diagram of a MAC RAR according to an embodiment of this application.
Figure 6:
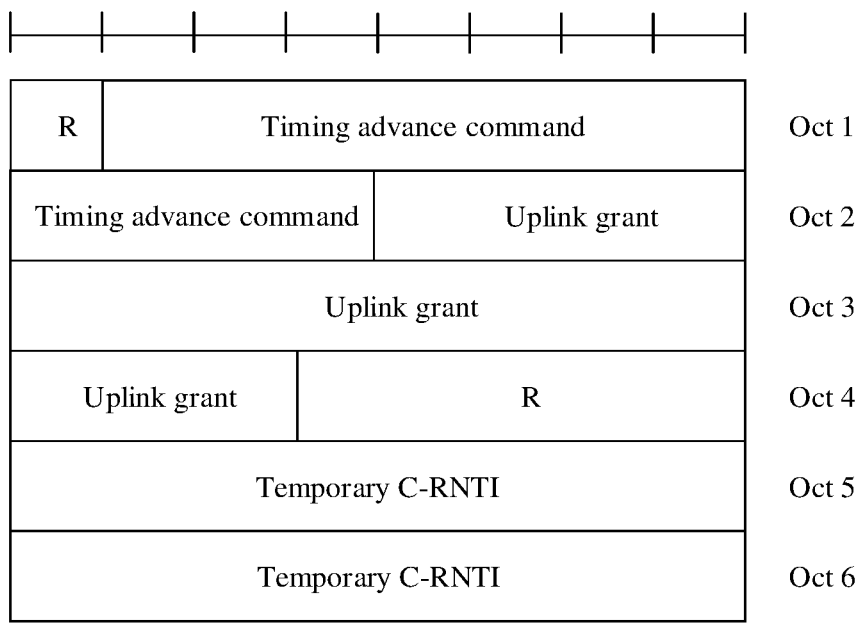
FIG. 6 is a schematic structural diagram of another MAC RAR according to an embodiment of this application.

When the second indication information is carried in the MAC RAR message in the message 2, for a structure of the MAC RAR, refer to FIG. 5. FIG. 5 is a schematic structural diagram of a MAC RAR according to an embodiment of this application. When the second indication information is carried by using one reserved bit R in the MAC RAR, if the reserved bit R is 0, it indicates that the quantity, of the candidate TBSs, indicated by the second indication information is 2; if the reserved bit R is 1, it indicates that the quantity, of the candidate TBSs, indicated by the second indication information is 4. Therefore, the second indication information is carried by using the RAR included in the message 2 and sent to the terminal device. Methods of using the reserved bit R to indicate any two numbers of 1, 2, 3, and 4 are all included in the present invention. In addition, it should be noted that, when the data transmission method is applied to an NB-IoT, for a structure of a corresponding MAC RAR, refer to FIG. 6. FIG. 6 is a schematic structural diagram of another MAC RAR according to an embodiment of this application. When the second indication information is carried by using two reserved bits R, because the MAC RAR in this scenario includes six reserved bits R, two reserved bits are randomly selected from the six reserved bits to carry the second indication information. Similarly, when the two reserved bits R are 00, it indicates that the quantity, of the candidate TBSs, indicated by the second indication information is 1; when the two reserved bits R are 01, it indicates that the quantity, of the candidate TBSs, indicated by the second indication information is 2; when the two reserved bits R are 10, it indicates that the quantity, of the candidate TBSs, indicated by the second indication information is 3; when the two reserved bits R are 11, it indicates that the quantity, of the candidate TBSs, indicated by the second indication information is 4. Therefore, the second indication information is carried by using the MAC RAR included in the message 2 and sent to the terminal device. The foregoing use of the reserved bits R is merely an example, and methods of using two reserved bits to indicate 1, 2, 3, or 4 are all included in the present invention. Alternatively, one reserved bit R of the six reserved bits is used to indicate two numbers. when the reserved bit R is 0, it indicates 2, and when the reserved bit R is 1, it indicates 4. Methods of using one reserved bit R to indicate any two numbers of 1, 2, 3, and 4 are all included in the present invention.

When the second indication information is carried in the uplink grant UL grant in the message 2, reference may be made to the following Table 1. When the second indication information is carried in the uplink grant UL grant, if a coverage enhancement mode of the terminal device is a mode A, the second indication information may be carried in bits that are in the uplink grant UL grant and that are used to indicate an MCS index, where two bits may be selected from three bits that indicate the MCS index to carry the second indication information; if a coverage enhancement mode of the terminal device is a mode B, the second indication information may be carried in two bits that are in the uplink grant UL grant and that are used to indicate a TBS index, so that the second indication information is carried by using the two bits. Similarly, when the two bits are 00, it indicates that the quantity, of the candidate TBSs, indicated by the second indication information is 1; when the two bits are 01, it indicates that the quantity, of the candidate TBSs, indicated by the second indication information is 2; when the two bits are 10, it indicates that the quantity, of the candidate TBSs, indicated by the second indication information is 3; when the two bits are 11, it indicates that the quantity, of the candidate TBSs, indicated by the second indication information is 4. Therefore, the second indication information is carried by using the uplink grant UL grant included in the message 2 and sent to the terminal device. The foregoing use of the bits is merely an example, and methods of using two bits to indicate 1, 2, 3, or 4 are all included in the present invention. Alternatively, one bit R of the bits is used to indicate two numbers. For example, "0" is used to indicate 2, and "1" is used to indicate 4. Methods of using one reserved bit R to indicate any two numbers of 1, 2, 3, and 4 are all included in the present invention.

TABLE 1

| DCI contents | CE mode A | CE mode B |
| --- | --- | --- |
| Msg3 PUSCH narrowband index | $N_{NB}^{index}$ | 2 |
| Msg3 PUSCH resource allocation | 4 | 3 |
| Number of repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4-N_{NB}^{index}$ | 0 |
| Total Nr-bits | 20 | 12 |

After the network device sends the first indication information to the terminal device in S202, the terminal device may perform the following S203.

S203: The terminal device obtains the first TBS set based on the second indication information.

The first TBS set is a set including the candidate TBSs that can be used by the terminal device. Optionally, the first TBS set may be a subset of a second TBS set, a quantity of elements in the first TBS set is equal to the quantity N of the candidate TBSs, and a largest TBS in the first TBS set is less than or equal to the TBS threshold indicated by the first indication information.

The first TBS set is the subset of the second TBS set. Therefore, before the first TBS set is determined, the second TBS set needs to be first obtained. Optionally, in this embodiment of this application, when the second TBS set is obtained, the second TBS set is specified in a communications protocol; or when the second TBS set is obtained, the second TBS set is obtained based on configuration information, and the configuration information is received from the network device. The configuration information is used to indicate the second TBS set, to be specific, indicate a value of a TBS in the second TBS set.

Optionally, the second TBS set may be determined based on the coverage enhancement mode. For example, if the coverage enhancement mode is the CE mode A, a PUSCH TBS set in the CE mode A includes 328, 376, 392, 408, 424, 440, 456, 472, 488, 504, 536, 552, 584, 600, 616, 680, 712, 744, 776, 808, 840, 872, 904, 936, and 1000, and the PUSCH TBS set is the second TBS set. If the coverage enhancement mode is the CE mode B, a PUSCH TBS set in the CE mode B includes 328, 392, 408, 424, 456, 472, 504, 536, 584, 600, 616, 680, 712, 776, 808, 872, and 936, and the PUSCH TBS set is the second TBS set.

Certainly, the second TBS set may alternatively be a largest TBS set in the coverage enhancement mode. The largest TBS set is a set including several largest TBSs, and a largest TBS indicated by the first indication information is an element in the largest TBS set. Referring to the following Table 2, the first column is an index of a largest TBS, the second column is a largest TBS in the CE mode A, and the third column is a largest TBS in the CE mode B.

TABLE 2

| Index (Index) | Largest TBS value in the CE mode A | Largest TBS value in the CE mode B |
| --- | --- | --- |
| 1 | 328 | 328 |
| 2 | x1 | y1 |
| 3 | x2 | y2 |
| 4 | x3 | y3 |
| 5 | x4 | y4 |

TABLE 2-continued

| Index (Index) | Largest TBS value in the CE mode A | Largest TBS value in the CE mode B |
| --- | --- | --- |
| 6 | x5 | y5 |
| 7 | x6 | y6 |
| 8 | 1000 | 936 |

328<x1<x2< ... <x6<1000, and 328<y1<y2< ... <y6<936. x1, x2, x3, x4, x5, and x6 may be a value in 376, 392, 408, 424, 440, 456, 472, 488, 504, 536, 552, 584, 600, 616, 680, 712, 744, 776, 808, 840, 872, 904, and 936; y1, y2, y3, y4, y5, and y6 may be a value in 392, 408, 424, 456, 472, 504, 536, 584, 600, 616, 680, 712, 776, 808, and 872.

It should be noted that the terminal device may determine the largest TBS set according to the following two different rules.

In one determining rule, the network device may determine m values based on arg min|K−(TBSmin+F(TBSMax−TBSmin)/(m+1)*m)|, where K indicates any value in the PUSCH TBS set in the coverage enhancement mode, TBSmin indicates a smallest TBS in the PUSCH TBS set in the coverage enhancement mode, TBSMax indicates a largest TBS in the PUSCH TBS set in the coverage enhancement mode, and N is an integer greater than or equal to 1.

With reference to the foregoing Table 2, for example, the network device may determine, based on the selection rule, that a largest TBS set in the CE mode A includes 328, 424, 536, 616, 712, 808, 904, and 1000, and a largest TBS set in the CE mode B includes 328, 408, 504, 584, 680, 776, 872, and 936. Therefore, for largest TBS sets corresponding to the two different CE modes, refer to Table 3.

TABLE 3

| Index (Index) | Largest TBS value in the CE mode A | Largest TBS value in the CE mode B |
| --- | --- | --- |
| 1 | 328 | 328 |
| 2 | 424 | 408 |
| 3 | 536 | 504 |
| 4 | 616 | 584 |
| 5 | 712 | 680 |
| 6 | 808 | 776 |
| 7 | 904 | 872 |
| 8 | 1000 | 936 |

In the other determining rule, the network device may determine N values based on arg min(K−(TBSmin+(TBSMax−TBSmin)/(N+1)*m)) and (K−(TBSmin+(TBSMax−TBSmin)/(N+1)*m))>0, where K indicates any value in the PUSCH TBS set in the coverage enhancement mode, TBSmin indicates a smallest TBS in the PUSCH TBS set in the coverage enhancement mode, TBSMax indicates a largest TBS in the PUSCH TBS set in the coverage enhancement mode, and N is an integer greater than or equal to 1.

With reference to the foregoing Table 2, for example, the network device may determine, based on the determining rule, that a largest TBS set in the CE mode A includes 328, 424, 536, 616, 712, 808, 904, and 1000, and a largest TBS set in the CE mode B includes 328, 424, 504, 600, 680, 776, 872, and 936. Therefore, for largest TBS sets corresponding the two different CE modes, refer to Table 4.

TABLE 4

| Index (Index) | Largest TBS value in the mode A | Largest TBS value in the mode B |
| --- | --- | --- |
| 1 | 328 | 328 |
| 2 | 424 | 424 |
| 3 | 536 | 504 |
| 4 | 616 | 600 |
| 5 | 712 | 680 |
| 6 | 808 | 776 |
| 7 | 904 | 872 |
| 8 | 1000 | 936 |

It should be noted that, in this embodiment of this application, only the foregoing two selection rules are used as examples for describing manners of determining the largest TBS set. Certainly, the largest TBS set may be determined by unevenly selecting TBS values. This is not further limited in this embodiment of this application.

After determining the second TBS set, the terminal device may obtain the first TBS set based on the second TBS set and the quantity, of the candidate TBSs, indicated by the second indication information.

Optionally, the first TBS set may include N TBSs, in the second TBS set, that are less than or equal to the TBS threshold indicated by the first indication information and that have smallest differences from the TBS threshold indicated by the first indication information, and N is the quantity of the candidate TBSs.

For example, the coverage enhancement mode of the terminal device is the CE mode A, and the second TBS set includes 328, 424, 536, 616, 712, 808, 904, and 1000. If the quantity N, of the candidate TBSs, indicated by the second indication information is 4, it is determined that the first TBS set includes a TBS threshold woo and three TBSs that have smallest differences from the TBS threshold, that is, 904, 808, and 712.

Certainly, the first TBS set may alternatively include N TBSs in the second TBS set, where the N TBSs include a smallest TBS and a largest TBS in the second TBS set, N is the quantity of the candidate TBSs, and the N TBSs are evenly distributed in the second TBS set. In the present invention, "even distribution" is approximately even distribution. The original concept even distribution is, for example, if eight integers are distributed between 1 and 10, the eight integers are 2, 3, 4, 5, 6, 7, 8, and 9. In other words, a property of an arithmetic progression is met. The approximately even distribution is, for example, if three integers are distributed between 1 and 10, the three integers are 3, 5 (or 6), and 8.

Similarly, for example, the coverage enhancement mode of the terminal device is the CE mode A, and the second TBS set includes 328, 424, 536, 616, 712, 808, 904, and 1000. If the quantity N, of the candidate TBSs, indicated by the second indication information is 4, it is determined that the first TBS set includes a TBS threshold 1000, a smallest TBS 328, and two TBSs evenly distributed between 328 and 1000. Optionally, when the two TBSs evenly distributed between 328 and 1000 are determined, reference may be made to the foregoing two determining rules. Details are not described herein again in this embodiment of this application.

S204: When the terminal device needs to send the first data, and a TBS required by the first data is less than or equal to the TBS threshold, the terminal device sends, to the network device, a random access preamble indicating EDT.

S205: The network device sends a message 2 to the terminal device.

It should be noted that, for message content included in the message 2, refer to the descriptions in S202. If the second indication information in S202 is carried in the system message, the message 2 in this step uses a message 2 in the prior art, in other words, the message 2 does not change. If the second indication information in S202 is carried in a message 2, a MAC subheader of the message 2 in this step may include the second indication information, an RAR of the message 2 may include the second indication information, or an uplink grant UL grant of the message 2 may include the second indication information. For details about how to carry the second indication information, refer to the descriptions in S202. Details are not described herein again in this embodiment of this application.

S206: The terminal device selects, from the first TBS set, the target TBS to be used for transmission of the first data.

The target TBS is a smallest TBS that is in the first TBS set and that is greater than or equal to the TBS required by the first data, and the target TBS is less than or equal to the TBS threshold indicated by the first indication information.

Optionally, the first data is a message 3 including user plane data.

After the first TBS set is determined, the target TBS to be used for transmission of the first data may be selected from the first TBS set, and the first data is transmitted based on the target TBS. For example, the first TBS set includes 712, 808, 904, and 1000. If the TBS required by the to-be-transmitted first data is 750, to reduce resource waste and improve resource utilization, a TBS that is in the first TBS set, that is greater than 750, and that has a smallest difference from 750 may be determined as the target TBS, in other words, the target TBS is 808.

S207: Send the first data to the network device based on the target TBS.

After the target TBS is determined, the first data may be sent to the network device based on the target TBS. For example, when the first data is sent to the network device based on the target TBS, if the TBS required by the first data is equal to the target TBS, the first data is directly sent to the network device based on the target TBS; if the TBS required by the first data is less than the target TBS, "0" needs to be additionally padded after the first data until a TBS required by data obtained after padding is equal to the target TBS, and then the first data is sent to the network device based on the target TBS (in this case, the first data includes a padding bit). For example, referring to the descriptions in S307, the TBS required by the first data is 750, and the target TBS is 808. In this case, when the first data is sent, the terminal device needs to additionally pad 58 bits "0" after the first data until a TBS required by data obtained after padding is equal to the target TBS 808, and then sends the first data based on the target TBS.

According to the data transmission method provided in this embodiment of this application, by receiving the first indication information and the second indication information that are sent by the network device, the terminal device may obtain the first TBS set based on the second indication information, select, from the first TBS set, the target TBS to be used for transmission of the first data, and then send the first data to the network device based on the target TBS, where the second indication information is used to indicate the quantity of the candidate TBSs. It can be learned that, when the first data is sent, the first TBS set is first obtained by using the second indication information, and the smallest TBS that is greater than or equal to the TBS required by the first data is selected from the first TBS set as the target TBS, which is different from the prior art in which data is directly transmitted based on the TBS threshold broadcast by the network device. Because the target TBS is greater than or equal to the TBS required by the first data, transmission of the first data is not affected when the first data is transmitted based on the target TBS. In addition, because the target TBS is the smallest TBS greater than or equal to the TBS required by the first data, a relatively small quantity of bits "0" need to be additionally padded, so that a relatively small quantity of resources are wasted and resource utilization is improved.

Figure 7:
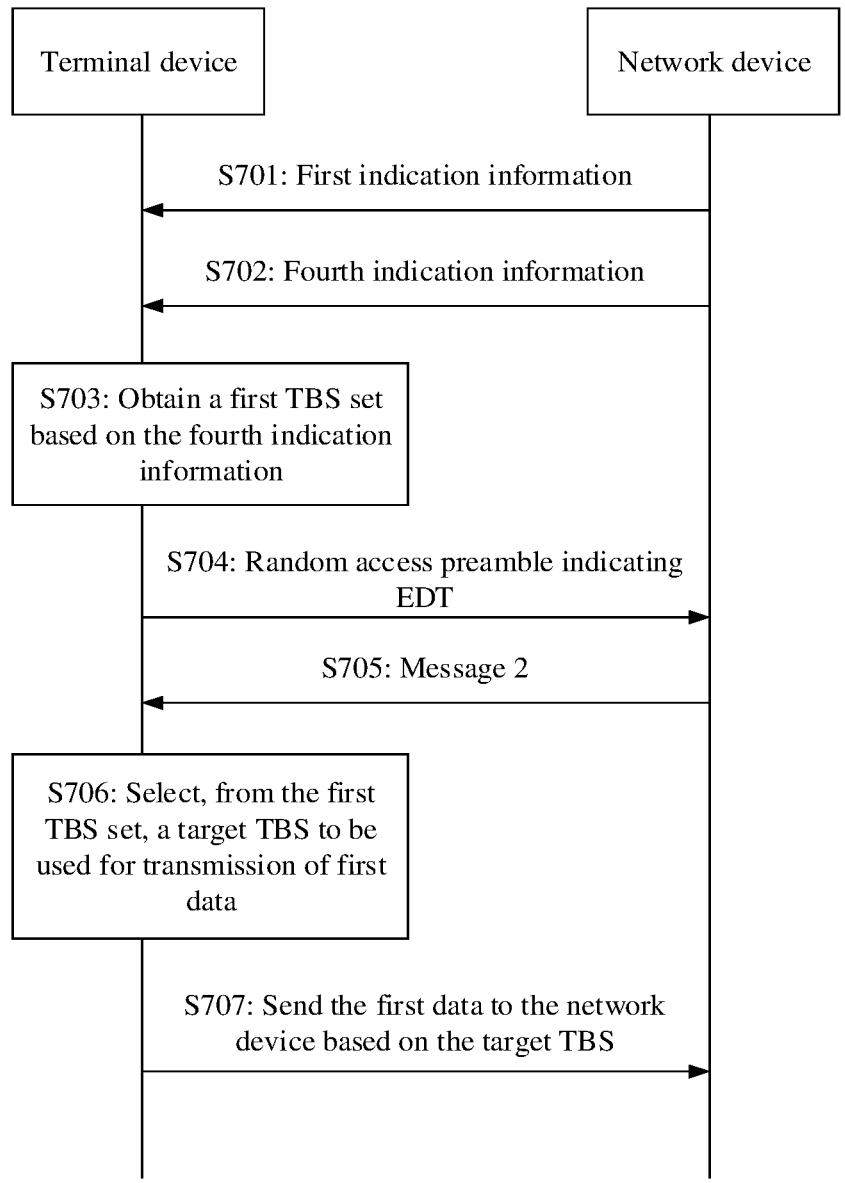
FIG. 7 is a schematic diagram of another data transmission method according to an embodiment of this application.

When the terminal device uses the second possible implementation, in other words, the terminal device obtains the first TBS set based on the fourth indication information, for a corresponding data transmission method, refer to FIG. 7. FIG. 7 is a schematic diagram of another data transmission method according to an embodiment of this application. The data transmission method may include the following steps.

S701: A network device sends first indication information to a terminal device.

The first indication information is used to indicate a transport block size TBS threshold.

For example, when receiving the first indication information, the terminal device may receive the first indication information by using a system message. A receiving process is specifically: The network device may broadcast the system message, where the system message includes the first indication information, so that the terminal device may receive the first indication information by using the system message.

S702: The network device sends fourth indication information to the terminal device.

The fourth indication information is used to indicate a first TBS set.

The fourth indication information may indicate the first TBS set in one of the following three possible indication manners. The manners are specifically as follows.

Manner 1: The fourth indication information includes the first TBS set, so that the terminal device may directly obtain the first TBS set based on the fourth indication information. For example, the first TBS set includes an integer quantity of TBS values. For example, the first TBS set is {A, B, C, D}, where A, B, C, and D are TBS values.

It should be noted that, in the manner 1, when the fourth indication information includes the first TBS set, the network device may send a system message to the terminal device, where the system message includes the fourth indication information, in other words, the fourth indication information may be carried in the system message and sent to the terminal device.

Manner 2: The fourth indication information includes a first TBS set index, and the first TBS set index corresponds to the first TBS set.

It should be noted that, in the manner 2, when the fourth indication information includes the first TBS set index, the network device may send a system message to the terminal device, where the system message includes the fourth indication information, in other words, the fourth indication information may be carried in the system message and sent to the terminal device. Alternatively, the network device may send a message 2 to the terminal device, and a MAC subheader included in the message 2 may include the fourth indication information, and therefore the fourth indication information is sent to the terminal device by using the MAC subheader; or a random access response RAR included in the message 2 may include the fourth indication information, and therefore the fourth indication information is sent to the terminal device by using the RAR; or an uplink grant UL grant included in the message 2 includes the fourth indication information, and therefore the fourth indication information is sent to the terminal device by using the UL grant. When the fourth indication information is sent to the terminal device by using the system message or the message 2, for a specific manner of carrying the fourth indication information, refer to the related descriptions in S202. Details are not described herein again in this embodiment of this application.

Manner 3: The fourth indication information includes an index of an element in a second TBS set.

The index of the element in the second TBS set is used to enable the terminal device to obtain the first TBS set, and the first TBS set includes the element that is in the second TBS set and that is corresponding to the index included in the fourth indication information.

It should be noted that, in the manner 3, when the fourth indication information includes the index of the element in the second TBS set, the network device may send a system message to the terminal device, where the system message includes the fourth indication information, in other words, the fourth indication information may be carried in the system message and sent to the terminal device. Certainly, the network device may send a message 2 to the terminal device, where an uplink grant UL grant included in the message 2 includes the fourth indication information, in other words, the fourth indication information may be carried in the uplink grant UL grant and sent to the terminal device. When the fourth indication information is sent to the terminal device by using the system message or the uplink grant UL grant, for a specific manner of carrying the fourth indication information, refer to the related descriptions in S202. Details are not described herein again in this embodiment of this application.

S703: The terminal device obtains the first TBS set based on the fourth indication information.

When the terminal device obtains the first TBS set based on the fourth indication information, because the fourth indication information includes a plurality of different indication manners, correspondingly, the terminal device may also obtain the first TBS set in different obtaining manners. The following describes in detail these different obtaining manners.

When the fourth indication information includes the first TBS set, the terminal device may directly obtain the first TBS set based on the fourth indication information including the first TBS set. For example, if the first TBS set that can be used by the terminal device includes 712, 808, 904, and 1000, the network device directly sends the first TBS set including 712, 808, 904, and 1000 to the terminal device by using the system message, so that the terminal device may directly obtain the first TBS set based on the fourth indication information carried in the system message.

When the fourth indication information includes the first TBS set index, and the first TBS set index corresponds to the first TBS set, the terminal device may prestore a plurality of available candidate TBS sets, and each candidate TBS set corresponds to a TBS set index of the candidate TBS set. The network device may send the fourth indication information including the first TBS set index to the terminal device, so that the terminal device may determine the first TBS set based on the first TBS set index included in the fourth indication information. For example, if the terminal device prestores four candidate TBS sets, where a first candidate TBS set includes 328, 472, 680, and 1000, and a TBS set index corresponding to the first candidate TBS set is 1; a second candidate TBS set includes 328, 456, 714, and 1000, and a TBS set index corresponding to the second candidate TBS set is 2; a third candidate TBS set includes 328, 488, 744, and 1000, and a TBS index set corresponding to the third candidate TBS set is 3; and a fourth candidate TBS set includes 712, 808, 904, and 1000, and a TBS set index corresponding to the fourth candidate TBS set is 4, the network device may send the fourth indication information including the first TBS set index 4 to the terminal device. After receiving the fourth indication information, the terminal device may determine, based on the first TBS set index 4 included in the fourth indication information, that the first TBS set is the fourth candidate TBS set including 712, 808, 904, and 1000, and therefore obtain the first TBS set.

When the fourth indication information includes the index of the element in the second TBS set, the first TBS set includes the element that is in the second TBS set and that is corresponding to the index included in the fourth indication information. Therefore, before the first TBS set is determined, the second TBS set needs to be first obtained. Optionally, in this embodiment of this application, when the second TBS set is obtained, the second TBS set is specified in a communications protocol; or the second TBS set is obtained based on configuration information, and the configuration information is received from the network device. The configuration information is used to indicate the second TBS set. Herein, for an obtaining manner and an obtaining process of the second TBS set, refer to the related descriptions in S202. Details are not described herein again in this embodiment of this application.

After the second TBS set is obtained, the first TBS set may be determined based on the second TBS set and the index included in the fourth indication information. For example, referring to the foregoing Table 3, if the second TBS set includes 328 corresponding to an index 1, 424 corresponding to an index 2, 536 corresponding to an index 3, 616 corresponding to an index 4, 712 corresponding to an index 5, 808 corresponding to an index 6, 904 corresponding to an index 7, and 1000 corresponding to an index 8 in a CE mode A, and the fourth indication information includes indexes 5, 6, 7, and 8, it may be determined, based on the second TBS set and the indexes 5, 6, 7, and 8, that the first TBS set includes 712, 808, 904, and 1000, and therefore the first TBS set is obtained.

S704: When the terminal device needs to send first data, and a TBS required by the first data is less than or equal to the TBS threshold, the terminal device sends, to the network device, a random access preamble indicating EDT.

S705: The network device sends a message 2 to the terminal device.

It should be noted that, for message content included in the message 2, refer to the descriptions in S702. If the fourth indication information in S702 is carried in the system message, the message 2 in this step uses a message 2 in the prior art. If the fourth indication information in S702 is carried in a message 2, a MAC subheader of the message 2 in this step may include the fourth indication information, an RAR of the message 2 may include the fourth indication information, or an uplink grant UL grant of the message 2 in this step may include the fourth indication information. For details about how to carry the fourth indication information, refer to the descriptions in S702. Details are not described herein again in this embodiment of this application.

S706: The terminal device selects, from the first TBS set, a target TBS to be used for transmission of the first data.

The target TBS is a smallest TBS that is in the first TBS set and that is greater than or equal to the TBS required by the first data, and the target TBS is less than or equal to the TBS threshold indicated by the first indication information.

After the first TBS set is determined, the target TBS to be used for transmission of the first data may be selected from the first TBS set, and the first data is transmitted based on the target TBS. For example, the first TBS set includes 712, 808, 904, and 1000. If the TBS required by the to-be-transmitted first data is 750, to reduce resource waste and improve resource utilization, a TBS that is in the first TBS set, that is greater than 750, and that has a smallest difference from 750 may be determined as the target TBS, in other words, the target TBS is 808.

S707: Send the first data to the network device based on the target TBS.

After the target TBS is determined, the first data may be sent to the network device based on the target TBS. For example, when the first data is sent to the network device based on the target TBS, if the TBS required by the first data is equal to the target TBS, the first data is directly sent to the network device based on the target TBS; if the TBS required by the first data is less than the target TBS, "0" needs to be additionally padded after the first data until a TBS required by first data obtained after padding is equal to the target TBS, and then the first data is sent to the network device based on the target TBS. For example, referring to the descriptions in S307, the TBS required by the first data is 750, and the target TBS is 808. In this case, when the first data is sent, the terminal device needs to additionally pad 58 bits "0" after the first data until a TBS required by first data obtained after padding is equal to the target TBS 808, and then sends the first data based on the target TBS.

According to the data transmission method provided in this embodiment of this application, by receiving the first indication information and the fourth indication information that are sent by the network device, the terminal device may obtain the first TBS set based on the fourth indication information, select, from the first TBS set, the target TBS to be used for transmission of the first data, and then send the first data to the network device based on the target TBS, where the fourth indication information is used to indicate the first TBS set. It can be learned that, when the first data is sent, the first TBS set is first obtained by using the fourth indication information, and the smallest TBS that is greater than or equal to the TBS required by the first data is selected from the first TBS set as the target TBS, which is different from the prior art in which data is directly transmitted based on the TBS threshold broadcast by the network device. Because the target TBS is greater than or equal to the TBS required by the first data, transmission of the first data is not affected when the first data is transmitted based on the target TBS. In addition, because the target TBS is the smallest TBS greater than or equal to the TBS required by the first data, a relatively small quantity of bits "0" need to be additionally padded, so that a relatively small quantity of resources are wasted and resource utilization is improved.

Figure 8:
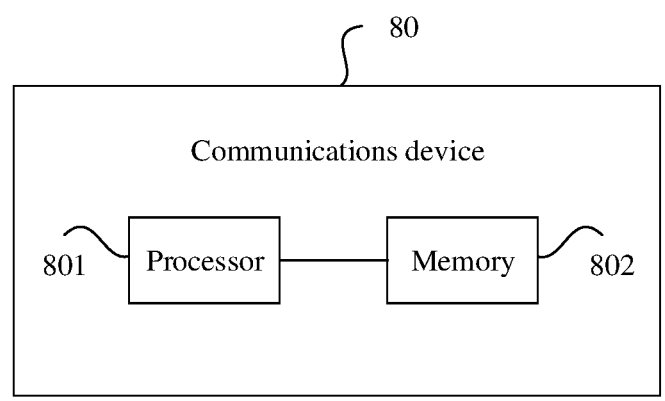
FIG. 8 is a schematic structural diagram of a communications device according to an embodiment of this application.

FIG. 8 is a schematic structural diagram of a communications device 80 according to an embodiment of this application. With reference to FIG. 8, the communications device 80 may include a processor 801, and the processor 801 is configured to: be coupled to a memory 802, and read and execute an instruction in the memory 802, to implement the data transmission method according to any one of the first aspect and the possible implementations of the first aspect.

Optionally, the communications device 80 may further include: the memory 802.

The communications device 80 shown in this embodiment of this application may perform the technical solution of the data transmission method shown in any one of the foregoing embodiments. Implementation principles and beneficial effects of the communications device 80 are similar to those of the data transmission method, and details are not described herein again.

Figure 9:
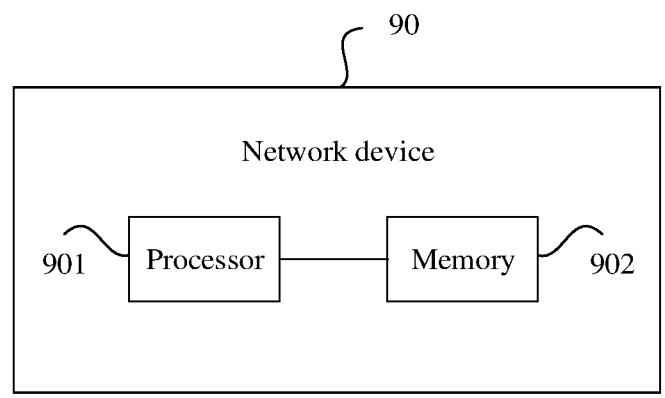
FIG. 9 is a schematic structural diagram of a network device according to an embodiment of this application.

FIG. 9 is a schematic structural diagram of a network device 90 according to an embodiment of this application. With reference to FIG. 9, the network device 90 may include a processor 901, and the processor 901 is configured to: be coupled to a memory 902, and read and execute an instruction in the memory 902, to implement the data transmission method according to any one of the second aspect and the possible implementations of the second aspect.

Optionally, the network device 90 may include: the memory 902.

The network device 90 shown in this embodiment of this application may perform the technical solution of the data transmission method shown in any one of the foregoing embodiments. Implementation principles and beneficial effects of the network device 90 are similar to those of the data transmission method, and details are not described herein again.

An embodiment of this application further provides a computer storage medium. The computer storage medium includes an instruction; and when the instruction is run on a communications device, the communications device is enabled to perform the data transmission method according to any one of the first aspect and the possible implementations of the first aspect. Implementation principles and beneficial effects of the computer storage medium are similar to those of the data transmission method, and details are not described herein again.

An embodiment of this application further provides a computer storage medium. The computer storage medium includes an instruction; and when the instruction is run on a network device, the network device is enabled to perform the data transmission method according to any one of the second aspect and the possible implementations of the second aspect. Implementation principles and beneficial effects of the computer storage medium are similar to those of the data transmission method, and details are not described herein again.

An embodiment of this application further provides a chip. The chip stores a computer program; and when the computer program is executed by a processor, the processor performs the data transmission method shown in any one of the foregoing embodiments. Implementation principles and beneficial effects of the chip are similar to those of the data transmission method, and details are not described herein again.

An embodiment of this application further provides a communications system. The communications system includes the communication device shown in any one of the foregoing embodiments and the network device shown in any one of the foregoing embodiments. Implementation principles and beneficial effects of the communications system are similar to those of the communications device and the network device, and details are not described herein again.

The processor in the foregoing embodiments may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by a combination of hardware and software modules in the decoding processor. A software module may be located in a mature storage medium in the aft, such as a random access memory (RAM), a flash memory, a read-only memory (ROM), a programmable read-only memory, an electrically erasable programmable memory, a register, or the like. The storage medium is located in a memory, and a processor reads an instruction in the memory, to complete the steps in the foregoing methods in combination with hardware of the processor.

In the several embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

What is claimed is:

1. A method, comprising:
receiving, from a network device, first indication information and second indication information in a system message, wherein the first indication information indicates a transport block size (TBS) threshold, and wherein the second indication information indicates a quantity N of candidate TBSs;
obtaining a first TBS set based on the quantity N of the candidate TBSs, wherein a quantity of elements in the first TBS set is equal to the quantity N of the candidate TBSs, and a largest TBS in the first TBS set is less than or equal to the TBS threshold indicated by the first indication information;
selecting, from the first TBS set, a target TBS to be used for transmission of first data, wherein the target TBS is a smallest TBS, in the first TBS set, that is greater than or equal to a TBS required by the first data; and
sending the first data to the network device based on the target TBS.

2. The method according to claim 1, wherein the first TBS set is a subset of a second TBS set, the second TBS set is a TBS set in a coverage enhancement (CE) mode, and the CE mode is a CE mode A or a CE mode B; and wherein:
when the CE mode is the CE mode A, the second TBS set comprises 328, 376, 392, 408, 424, 440, 456, 472, 488, 504, 536, 552, 584, 600, 616, 680, 712, 744, 776, 808, 840, 872, 904, 936, and 1000; or
when the CE mode is the CE mode A, the second TBS set comprises 328, 424, 536, 616, 712, 808, 904, and 1000; or
when the CE mode is the CE mode B, the second TBS set comprises 328, 392, 408, 424, 456, 472, 504, 536, 584, 600, 616, 680, 712, 776, 808, 872, and 936; or
when the CE mode is the CE mode B, the second TBS set comprises 328, 408, 504, 584, 680, 776, 872, and 936.

3. The method according to claim 1, further comprising: receiving third indication information from the network device, wherein the third indication information indicates a coverage enhancement level, and the coverage enhancement level is associated with the quantity N of the candidate TBSs.

4. The method according to claim 3, wherein the third indication information is received in the system message.

5. The method according to claim 1, wherein the first data is a message 3 comprising user plane data.

6. The method according to claim 1, wherein the first TBS set is a subset of a second TBS set, wherein the first TBS set includes N TBSs, in the second TBS set, that are less than or equal to the TBS threshold, wherein the quantity N of the candidate TBSs is associated with a coverage enhancement level of a plurality of coverage enhancement levels, and wherein different coverage enhancement levels of the plurality of coverage enhancement levels are associated with different quantities of the candidate TBSs.

7. A method, comprising:
sending, to a terminal device, first indication information and second indication information in a system message, wherein the first indication information indicates a transport block size (TBS) threshold, the second indication information indicates a quantity N of candidate TBSs, the quantity N of the candidate TBSs is a quantity of elements in a first TBS set, the first TBS set is related to the quantity N of the candidate TBSs, and a largest TBS in the first TBS set is less than or equal to the TBS threshold indicated by the first indication information; and
receiving first data from the terminal device, wherein the first data is related to a target TBS, and the target TBS is a smallest TBS, in the first TBS set, greater than or equal to a TBS required by the first data.

8. The method according to claim 7, wherein the first TBS set is a subset of a second TBS set, the second TBS set is a TBS set in a coverage enhancement (CE) mode, and the CE mode is a CE mode A or a CE mode B; and
wherein:
when the CE mode is the CE mode A, the second TBS set comprises 328, 376, 392, 408, 424, 440, 456, 472, 488, 504, 536, 552, 584, 600, 616, 680, 712, 744, 776, 808, 840, 872, 904, 936, and 1000; or
when the CE mode is the CE mode A, the second TBS set comprises 328, 424, 536, 616, 712, 808, 904, and 1000; or
when the CE mode is the CE mode B, the second TBS set comprises 328, 392, 408, 424, 456, 472, 504, 536, 584, 600, 616, 680, 712, 776, 808, 872, and 936; or
when the CE mode is the CE mode B, the second TBS set comprises 328, 408, 504, 584, 680, 776, 872, and 936.

9. The method according to claim 7, further comprising:
sending third indication information to the terminal device, wherein the third indication information indicates a coverage enhancement level, and the coverage enhancement level is associated with the quantity N of the candidate TBSs.

10. The method according to claim 7, wherein the first data is a message 3 comprising user plane data.

11. A communications device, comprising:
at least one processor; and
a non-transitory computer readable storage medium storing programming for execution by the at least one processor, the programming including instructions to cause the communications device to perform operations comprising:
receiving, from a network device, first indication information and second indication information in a system message, wherein the first indication information indicates a transport block size (TBS) threshold, and wherein the second indication information indicates a quantity N of candidate TBSs;
obtaining a first TBS set based on the quantity N of the candidate TBSs, wherein a quantity of elements in the first TBS set is equal to the quantity N of the candidate TBSs, and a largest TBS in the first TBS set is less than or equal to the TBS threshold indicated by the first indication information;
selecting, from the first TBS set, a target TBS to be used for transmission of first data, wherein the target TBS is a smallest TBS, in the first TBS set, greater than or equal to a TBS required by the first data; and
sending the first data to the network device based on the target TBS.

12. The communications device according to claim 11, wherein the first TBS set is a subset of a second TBS set, the second TBS set is a TBS set in a coverage enhancement (CE) mode, and the CE mode is a CE mode A or a CE mode B; and
wherein:
when the CE mode is the CE mode A, the second TBS set comprises 328, 376, 392, 408, 424, 440, 456, 472, 488, 504, 536, 552, 584, 600, 616, 680, 712, 744, 776, 808, 840, 872, 904, 936, and 1000; or
when the CE mode is the CE mode A, the second TBS set comprises 328, 424, 536, 616, 712, 808, 904, and 1000; or
when the CE mode is the CE mode B, the second TBS set comprises 328, 392, 408, 424, 456, 472, 504, 536, 584, 600, 616, 680, 712, 776, 808, 872, and 936; or
when the CE mode is the CE mode B, the second TBS set comprises 328, 408, 504, 584, 680, 776, 872, and 936.

13. The communications device according to claim 11, the operations further comprising:
receiving third indication information from the network device, wherein the third indication information indicates a coverage enhancement level, and the coverage enhancement level is associated with the quantity N of the candidate TBSs.

14. The communications device according to claim 11, wherein the first data is a message 3 comprising user plane data.

15. A network device, comprising:
at least one processor; and
a non-transitory computer readable storage medium storing programming for execution by the at least one processor, the programming including instructions to cause the network device to perform operations comprising:

sending, to a terminal device, first indication information and second indication information in a system message, wherein the first indication information indicates a transport block size (TBS) threshold, the second indication information indicates a quantity N of candidate TBSs, the quantity N of the candidate TBSs is a quantity of elements in a first TBS set, the first TBS set is related to the quantity N of the candidate TBSs, and a largest TBS in the first TBS set is less than or equal to the TBS threshold indicated by the first indication information; and receiving first data from the terminal device, wherein the first data is related to a target TBS, and the target TBS is a smallest TBS, in the first TBS set, greater than or equal to a TBS required by the first data.

16. The network device according to claim 15, wherein the first TBS set is a subset of a second TBS set, the second TBS set is a TBS set in a coverage enhancement (CE) mode, and the CE mode is a CE mode A or a CE mode B; and wherein:

when the CE mode is the CE mode A, the second TBS set comprises 328, 376, 392, 408, 424, 440, 456, 472, 488, 504, 536, 552, 584, 600, 616, 680, 712, 744, 776, 808, 840, 872, 904, 936, and 1000; or when the CE mode is the CE mode A, the second TBS set comprises 328, 424, 536, 616, 712, 808, 904, and 1000; or when the CE mode is the CE mode B, the second TBS set comprises 328, 392, 408, 424, 456, 472, 504, 536, 584, 600, 616, 680, 712, 776, 808, 872, and 936; or when the CE mode is the CE mode B, the second TBS set comprises 328, 408, 504, 584, 680, 776, 872, and 936.

17. The network device according to claim 15, the operations further comprising:

sending third indication information to the terminal device, wherein the third indication information indicates a coverage enhancement level, and the coverage enhancement level is associated with the quantity N of the candidate TBSs.

18. The network device according to claim 1, wherein the first data is a message 3 comprising user plane data.

* * * * *

UNITED STATES PATENT AND TRADEMARK OFFICE
CERTIFICATE OF CORRECTION

PATENT NO. : 11,758,522 B2  
APPLICATION NO. : 17/035200  
DATED : September 12, 2023  
INVENTOR(S) : Wang et al.

Page 1 of 1

It is certified that error appears in the above-identified patent and that said Letters Patent is hereby corrected as shown below:

In the Claims

In Column 24, in Claim 18, Line 21, delete "claim 1," and insert -- claim 15, --.

Signed and Sealed this  
Fifth Day of December, 2023

Katherine Kelly Vidal  
*Director of the United States Patent and Trademark Office*